(No Model.)

W. Y. THOMPSON.
DUST GUARD FOR AIR BRAKE HOSE COUPLINGS.

No. 571,708.　　　　　　　　　　Patented Nov. 17, 1896.

Witnesses:
Robert Everett
Geo. N. Rea.

Inventor:
William Y. Thompson.
By James L. Norris.
Atty.

UNITED STATES PATENT OFFICE.

WILLIAM Y. THOMPSON, OF FORT HOWARD, WISCONSIN.

DUST-GUARD FOR AIR-BRAKE HOSE-COUPLINGS.

SPECIFICATION forming part of Letters Patent No. 571,708, dated November 17, 1896.

Application filed March 9, 1896. Serial No. 582,464. (No model.)

*To all whom it may concern:*

Be it known that I, WILLIAM Y. THOMPSON, a citizen of the United States, residing at Fort Howard, in the county of Brown and State of Wisconsin, have invented new and useful Improvements in Dust-Guards for Air-Brake Hose-Couplings, of which the following is a specification.

This invention relates to a dust-guard for air-brake hose-couplings.

In air-brake systems for railway-cars the brake-cylinders are connected together by train-pipes and hose, the hose of the respective cars being connected by detachable couplings to permit of the cars being coupled together and uncoupled or separated. When the hose-couplings are disconnected or uncoupled, dust, cinders, and the like enter and effect a lodgment in the couplings, and when the couplings are coupled together the dust and cinders are blown through the whole line of train-pipes, hose, valves, and air-chambers, cutting and clogging up the parts and tending to damage and disorganize the entire air-brake system.

It is the object of the present invention to provide an improved guard for preventing the entrance of dust, cinders, and the like into the couplings, and further to make such guard automatic in operation, so that when the hose is coupled together an unobstructed passage shall be provided for the free distribution of the air from one car to another, but when the couplings are disconnected they will be effectually sealed against the entrance of dust, cinders, and other foreign matters.

To these ends my invention consists in the features and in the combination or arrangement of parts hereinafter described, and pointed out in the claims following the description, reference being had to the accompanying drawings, forming a part of this specification, wherein—

Figure 1:
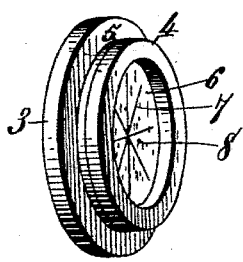
Figure 2:
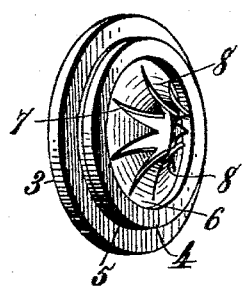
Figure 3:
Figure 4:
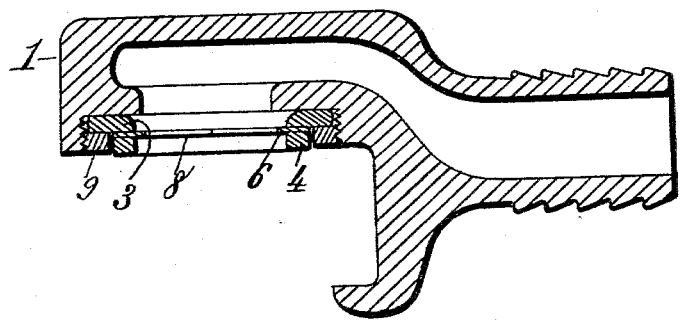

Figure 1 is a perspective of my improved dust-guard. Fig. 2 is a similar view illustrating the tongues in the position they assume when subjected to the pressure of the air in the brake system. Fig. 3 is a transverse section of the guard, and Fig. 4 is a sectional view illustrating the guard applied to a hose-coupling.

Referring to the drawings, the numeral 1 indicates one-half of an ordinary air-brake hose-coupling provided with the usual air-valve and coupling devices. Seated in the extreme end of said coupling member or section is a gasket 2, consisting of two annular sections 3 and 4 of the same internal diameter, but the external diameter of one section, as 3, being greater than the external diameter of the other section 4, forming a shoulder 5, against which is adapted to be screwed an annular washer 9, that operates to hold the gasket 2 to its seat in the coupling in a well-known manner.

Disposed between the annular sections 3 and 4 of the gasket is a flexible, elastic, or resilient diaphragm 6, preferably formed of india-rubber or similar or equivalent material, the said diaphragm and sections being cemented or otherwise suitably fastened together. The said diaphragm is provided with a plurality of slits or incisions 7, that extend from the center of the diaphragm radially outward to near the periphery thereof or to the inner periphery of the annular section 4 of the gasket. The incisions or slits thus cut in the diaphragm form a series of V-shaped tongues 8, whose edges abut against the edges of the adjacent tongues, and the apices thereof meet at the common center of the diaphragm. When in this position, the tongues 8 form in effect an imperforate or solid diaphragm that effectually prevents the passage therethrough of dirt, cinders, and other substances.

The operation of my improved dust-guard will be readily understood from the foregoing description. When the hose-sections are coupled together, the pressure of the air forces the tongues open and maintains them in this position, thus affording an unobstructed passage for the air from one car to another, but when the couplings are detached and the air in the train-pipes and hose-sections is restored to an equilibrium the tongues, owing to their elasticity or resiliency, immediately spring back to their normal position, effectually closing the coupling members or sections against the entrance of dust or the like.

It will be apparent that the diaphragm yields under the pressure of the air in either direction, thus permitting the device to be used in either atmospheric-pressure or vacuum brake systems without alteration and without change of any kind whatever. It also renders the device operative whether the train is running ahead or backward, and also permits the cars to be coupled from either end, and in addition to the above advantages permits a coupling provided with my improved dust-guard to be coupled to a similar coupling unprovided with a guard.

The great utility of my improved dust-guard will be apparent, as, owing to the great prevalency of dust, cinders, and gritty substances along and about railway-tracks, it will be evident that unprotected couplings, when disconnected, are necessarily subject to the entrance of such substances, which form a lodgment therein, and when the couplings are coupled together and the air is applied such substances are violently blown through the train-pipes, hose-sections, valves, and air-chambers, cutting and otherwise damaging and clogging up the parts and forming a serious hindrance to the effective operation of the entire air-brake system.

The operation of the guard is entirely automatic, the tongues 8 closing by their own elasticity or resiliency when the hose-sections are disconnected and the pressure of the air acting to hold the tongues open when the hose-sections are coupled up in the brake system.

I have described, for the sake of illustration, the guard as applied to an air-pressure brake system, but it will be manifest that the same may be used with equal facility and success in connection with vacuum brake systems or with fluid-pressure brake systems other than air. I have also described the gasket and diaphragm as being made of rubber, but it will be evident that various elastic or flexible substances or materials may be used in place of rubber, and I therefore do not wish to be understood as confining myself to any particular material.

The improved guard is inexpensive and durable and may be applied to ordinary hose-couplings now in use as well as to newly-manufactured couplings, and worn or damaged guards may be instantly removed and replaced by new ones without disturbing or disarranging any of the parts of the couplings.

Having described my invention, what I claim is—

1. The combination with a fluid-pressure-brake coupling, of a flexible diaphragm seated in said coupling, said diaphragm having a plurality of radial slits forming V-shaped tongues which, when closed, lie in the same flat plane to prevent the passage therethrough of solid substances, but which yield in either direction under the pressure of a fluid to form an unobstructed passage therefor, substantially as described.

2. In a dust-guard for hose-couplings, the combination of a gasket consisting of two annular sections superimposed one upon the other, and an elastic diaphragm secured between said sections and provided with a plurality of radial slits extending from its center to near the periphery thereof, substantially as described.

3. In a dust-guard for hose-couplings, the combination of a gasket consisting of two annular sections 3 4 of the same internal diameter but of unequal external diameters, and an elastic diaphragm disposed between said annular sections and secured thereto and having a plurality of radial slits extending from its center to near its periphery, substantially as described and for the purpose specified.

In testimony whereof I have hereunto set my hand in presence of two subscribing witnesses.

WILLIAM Y. THOMPSON.

Witnesses:
MALCOLM A. SELLERS,
M. SELLERS.